(12) United States Patent
Wang et al.

(10) Patent No.: US 12,199,951 B2
(45) Date of Patent: Jan. 14, 2025

(54) CONTAINERIZED FIREWALL IN AN EMBEDDED DEVICE FOR PROTECTING AGAINST MALICIOUS DATA TRAFFIC ON A DATA COMMUNICATION NETWORK

(71) Applicant: Fortinet, Inc., Sunnyvale, CA (US)

(72) Inventors: Wei Wang, North Vancouver (CA); Dazhi Li, Surrey (CA)

(73) Assignee: Fortinet, Inc., Sunnyvale, CA (US)

( * ) Notice: Subject to any disclaimer, the term of this patent is extended or adjusted under 35 U.S.C. 154(b) by 182 days.

(21) Appl. No.: 17/710,715

(22) Filed: Mar. 31, 2022

(65) Prior Publication Data
US 2023/0319011 A1    Oct. 5, 2023

(51) Int. Cl.
*H04L 9/40* (2022.01)

(52) U.S. Cl.
CPC ...... *H04L 63/0263* (2013.01); *H04L 63/0236* (2013.01); *H04L 63/105* (2013.01); *H04L 63/20* (2013.01)

(58) Field of Classification Search
CPC ............. H04L 63/0263; H04L 63/0236; H04L 63/105; H04L 63/20
USPC .......................................................... 726/11
See application file for complete search history.

(56) References Cited

U.S. PATENT DOCUMENTS

| | | | |
|---|---|---|---|
| 10,484,334 B1 * | 11/2019 | Lee | H04L 67/30 |
| 2019/0362083 A1 * | 11/2019 | Ortiz | H04L 9/0844 |
| 2020/0403864 A1 * | 12/2020 | Saenger | H04L 12/4641 |
| 2022/0103593 A1 * | 3/2022 | Singh | H04L 63/0245 |
| 2023/0103989 A1 * | 4/2023 | Wang | G06F 8/433 717/144 |

* cited by examiner

*Primary Examiner* — Kambiz Zand
*Assistant Examiner* — Aubrey H Wyszynski
(74) *Attorney, Agent, or Firm* — Law Office of Dorian Cartwright; Dorian Cartwright

(57) ABSTRACT

A new container of a pool of containers is spawned in the operating system of the embedded networking device to execute a firewall separate from an operating system of a host device. Each of the containers is generated by a separate toolchain to include custom runtime libraries. The firewall utilizes the custom libraries rather than the host libraries, and wherein user privileges within a container is different from user privileges for the host. The new container executes a firewall instance to inspect data packets processed by the embedded networking device.

9 Claims, 4 Drawing Sheets

CONTAINERIZED FIREWALL IN AN EMBEDDED DEVICE FOR PROTECTING AGAINST MALICIOUS DATA TRAFFIC ON A DATA COMMUNICATION NETWORK

FIELD OF THE INVENTION

The invention relates generally to computer networking, and more specifically, for providing a firewall with containerization in an embedded networking device.

BACKGROUND

Next generation firewall (NGFW) provides advanced features, such as intrusion prevention, web filtering, antivirus, application control, device control/monitor, and VPN. Compared to traditional firewalls, the NGFWs provide deeper packet content inspection and analysis, such as application layer inspection.

For embedded networking devices, such as wireless routers, it is very difficult to integrate such complicated software components. Traditionally, a software development kit (SDK) is used to provide extra functionalities to provide next generation firewall features. The challenges including incompatible toolchains, conflicting supporting libraries, compromise containment. For example, a component written with GoLang might require a runtime library that cannot be provided by the host environment.

Therefore, what is needed is a robust technique for providing a firewall with containerization in an embedded networking device.

SUMMARY

These shortcomings are addressed by the present disclosure of methods, computer program products, and systems for providing a firewall with containerization in an embedded networking device.

In an embodiment, a new container of a pool of containers is spawned in the operating system of the embedded networking device to execute a firewall separate from an operating system of a host device. Each of the containers is generated by a separate toolchain to include custom runtime libraries. The firewall utilizes the custom libraries rather than the host libraries, and wherein user privileges within a container is different from user privileges for the host.

In another embodiment, the new container executes a firewall instance to inspect data packets processed by the embedded networking device.

Advantageously, network performance is improved with stronger firewall protection. Furthermore, computer device is improved with reduced malicious network traffic.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for providing a firewall with containerization in an embedded networking device.

One of ordinary skill in the art will recognize many additional variations made possible by the succinct description of techniques below.

I. Systems for Embedded Firewall Containerization (FIGS. 1-2)

Figure 1:
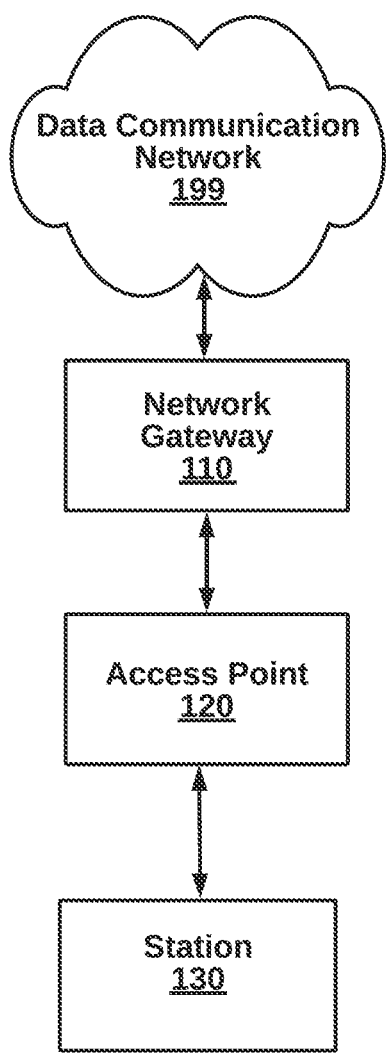
FIG. 1 is a block diagram illustrating a file sharing system for providing a firewall with containerization in an embedded networking device, according to an embodiment.
Figure 2:
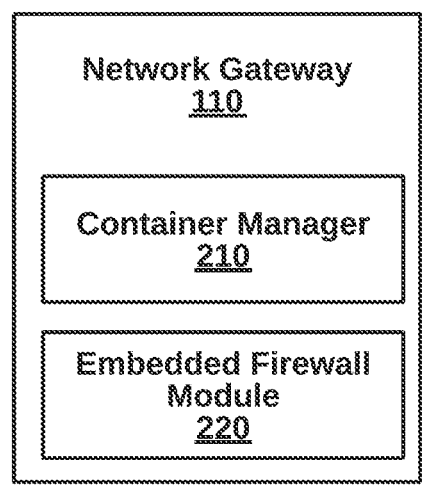
FIG. 2 is a more detailed block diagram illustrating a network device of the system of FIG. 1, according to an embodiment.

FIG. 1 is a block diagram illustrating a system 100 for providing a firewall with containerization in an embedded networking device, according to an embodiment. The system 100 includes a network gateway 110, an access point 120 and a station 130, coupled to a data communication network 199. Many other configurations are possible, for example, with additional network components such routers, switches, repeaters, firewalls, and the like. Also, there can be many more or fewer clients in FIG. 1. The system components can be implemented in computer devices with non-transitory source code, such as set forth below with reference to FIG. 4.

The components of the system 100 are coupled in communication over the data communication network. The components can be connected to the data communication system via hard wire. The data communication network 199 can be any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802.11r, and the like.

The network gateway 110 spawns containerized firewalls to protect the private network from malicious traffic. In the case of a security breach, compromised components from the container will be isolated and have much less chance of affecting the network gateway 110 or other network components.

A Linux-based software stack includes Lightweight Linux Container (LXC), an open source service using either virtualized or physical network interfaces to inspect traffic at the operating system level within the Linux kernel. An LXC runtime consists of tools, templates and library and language bindings. The LXC combines the kernel's cgroups and support for isolated namespaces to provide an isolated environment for firewalls, and other applications. Containers share the same kernel with anything else that is running on it, but can be constrained to only use a defined amount of resources such as CPU, memory or I/O. By combining containers with other features like the Btrfs file system or the Open vSwitch, it will be possible to quickly set up multiple lightweight isolated Linux instances with their own virtual network segment on a single host. In other embodiments, a Linux container hypervisor (LXD) is utilized, an open source container management extension for LXC. In still other embodiments, containers can be similar to hypervisors by VMware and application containers by Docker, as nonlimiting examples. Full-fledged virtual machines are not needed and thus LXC allows more efficient virtualization.

More generally, the network device 110 can have many services including a firewall service. Network traffic is scanned for malicious signatures, for instance, by comparing hashes of data packets to hashes stored in an exploit signature database. More detailed examples of the network gateway 110 are discussed further below.

The access point 120 is downstream from the network device 110 and manages wireless stations even further downstream. Traffic inspected by containers also passes through the access point 120. In some embodiments, the access point 120 also participates in scanning and other security actions. The station 140 communicates with resources on the data communication network 199 as an endpoint on the private network.

FIG. 2 is a more detailed block diagram illustrating an opportunistic key generation module 110 of the file sharing system of FIG. 1, according to an embodiment. The opportunistic key engine 110 includes a PMK-R0 key failure detector 210, an embedded firewall 220, a PMK-R1 key generator 230, and a PTK key generator 240. The modules can be implemented in source code stored in non-transitory memory executed by a processor. Alternatively, the modules can be implemented in hardware with microcode. The modules can be singular or representative of functionality spread over multiple components. Many other variations are possible.

The container manager 210 can spawn a new container in the operating system of the embedded networking device to execute a firewall separate from an operating system of a host device. Resources are partitioned for sharing between a pool of containers. In order to inspect network traffic from the host, there are multiple options available. Virtual interfaces, such as VETH, MACVLAN, could be used to redirect traffic from host to the container. To obtain the best performance, host networking mode can also be used. With host networking mode, the container shares the same network interfaces as the host without any virtualization cost.

Custom kernel modules are generally not allowed inside a container. But with the proper permissions, the container can use iptables/nftables rules to enforce firewall policies in kernel level. To do content based deep packet inspection, netfilter-queue or XDP (eXpress Data Path) can be used to redirect network packets to the user space and apply deep scanning, such as SSL/TLS deep inspection, IPS, AntiVirus, Web Filtering, etc.

Each of the containers is generated by a separate toolchain to include custom runtime libraries. The firewall utilizes the custom libraries rather than the host libraries. User privileges within a container is different from user privileges for the host.

The embedded firewall module 220 executes the firewall to inspect data packets processed by the embedded networking device.

II. Methods for Embedded Firewall Containerization (FIG. 3)

Figure 3:
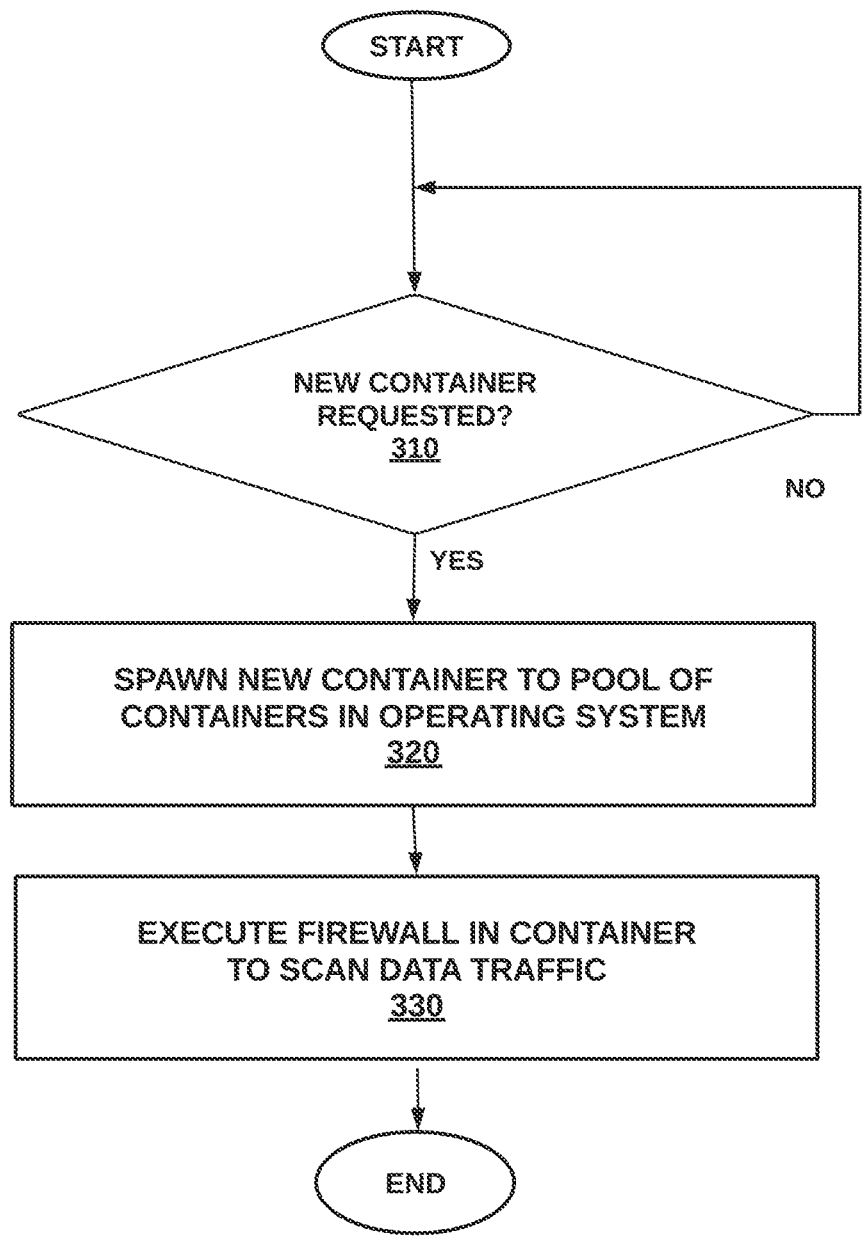
FIG. 3 is a high-level flow diagram illustrating a method for providing a firewall with containerization in an embedded networking device, according to one preferred embodiment.

FIG. 3 is a high-level flow diagram illustrating a method for providing a firewall with containerization in an embedded networking device, according to one preferred embodiment. The method 400 can be implemented, for example, by the system 100. The steps are merely representative groupings of functionality, as there can be more or fewer steps, and the steps can be performed in different orders. Many other variations of the method 300 are possible.

At step 310, a new container is spawned in the operating system of the embedded networking device to execute a firewall separate from an operating system of a host device. Each of the containers is generated by a separate toolchain to include custom runtime libraries, wherein the firewall utilizes the custom libraries rather than the host libraries, and wherein user privileges within a container is different from user privileges for the host.

At step 320, the containers execute firewall instances to inspect data packets processed by the embedded networking device.

III. Generic Computing Environment (FIG. 4)

Figure 4:
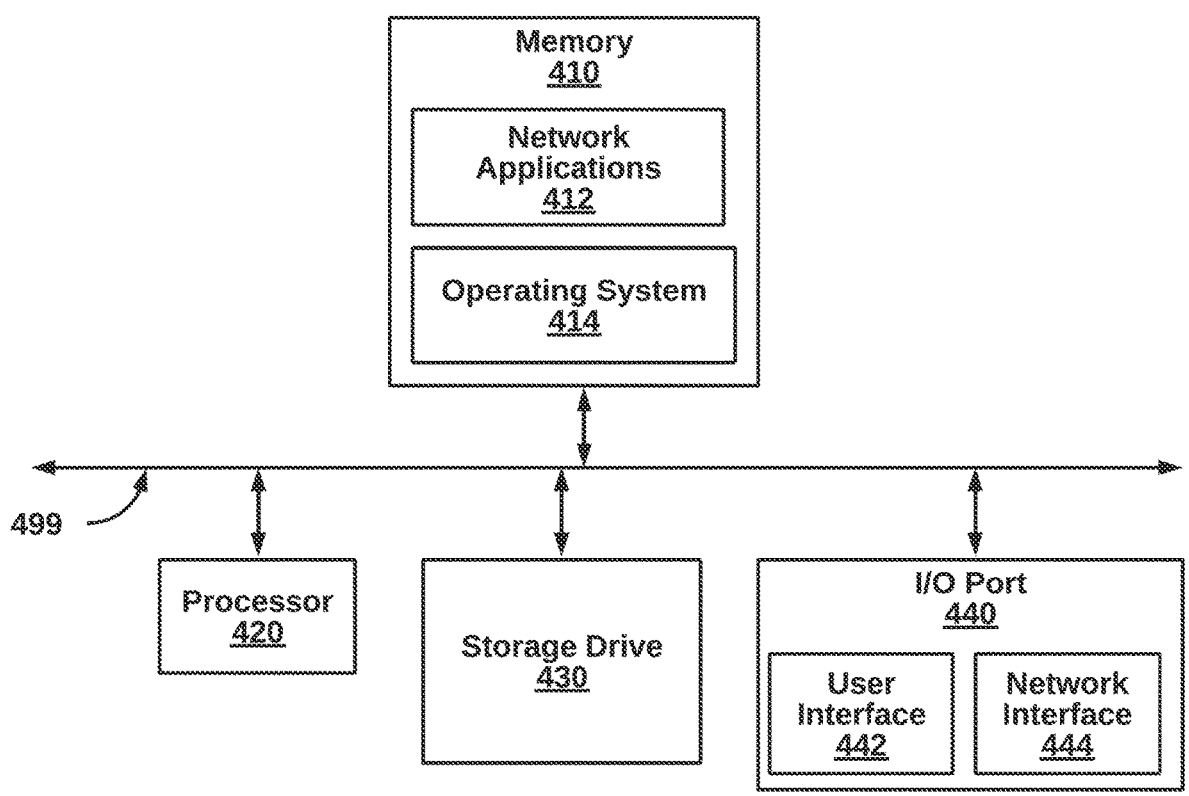
FIG. 4 is a high-level block diagram illustrating a computing device as an example hardware implementation of network devices herein, according to an embodiment.

FIG. 4 is a block diagram illustrating a computing device 400 capable of implementing components of the system, according to an embodiment. The computing device 400, of the present embodiment, includes a memory 410, a processor 420, a storage drive 430, and an I/O port 440. Each of the components is coupled for electronic communication via a bus 499. Communication can be digital and/or analog and use any suitable protocol. The computing device 400 can be any of components of the system 100 (e.g., network device 110, access point 120, and station 130), other networking devices (e.g., an access point, a firewall device, a gateway, a router, or a wireless station), or a disconnected device.

Network applications 412 (e.g., VM nodes 120A-F) can be network browsers, daemons communicating with other network devices, network protocol software, and the like. An operating system 414 within the computing device 400 executes software, processes. Standard components of the real OS environment 414 include an API module, a process list, a hardware information module, a firmware information module, and a file system. The operating system 414 can be FORTIOS, one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The storage drive 430 can be any non-volatile type of storage such as a magnetic disc, EEPROM (electronically erasable programmable read-only memory), Flash, or the like. The storage drive 430 stores code and data for applications.

The I/O port 440 further comprises a user interface 442 and a network interface 444. The user interface 442 can output to a display device and receive input from, for example, a keyboard. The network interface 444 (e.g., an RF antennae) connects to a medium such as Ethernet or Wi-Fi for data input and output. Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. An embedded network device, communicatively coupled to a data communication network with a plurality of stations, for providing a firewall with containerization in an embedded networking device, the embedded network device comprising:
a processor;
a network interface communicatively coupled to the processor and communicatively coupled to exchange data packets over the data communication network; and
a memory communicatively coupled to the processor and storing:
a container manager to spawn a new container of a plurality of containers in an operating system of a host to execute a firewall separate from the operating system of the host;
wherein each of the containers is generated by a separate toolchain to include custom runtime libraries, wherein the firewall utilizes the custom libraries rather than host libraries, and wherein user privileges within each container are different from user privileges for the host; and
an embedded firewall module to execute the firewall to inspect data packets processed by the embedded networking device.

2. The embedded network device of claim 1, wherein a first container of the plurality of containers is generated by a first toolchain and a second container of the plurality of containers is generated by a second toolchain.

3. The embedded network device of claim 1, wherein a first container is associated with a first set of user privileges and a second container is associated with a second set of user privileges.

4. The embedded network device of claim 1, wherein the plurality of containers do not support customer kernel modules.

5. The embedded network device of claim 1, wherein, in networking mode, the plurality of containers share the same network interface as the host.

6. The embedded network device of claim 1, wherein the plurality of containers use iptables and/or nftables to enforce firewall polices in a kernel level.

7. The embedded network device of claim 1, wherein network packets are redirected to a user space to apply deep packet scanning.

8. A method in an embedded network device communicatively coupled to a data communication network with a plurality of stations, for providing a firewall with containerization in an embedded networking device, the method comprising the steps of:
spawning a new container of a plurality of containers in an operating system of a host to execute a firewall separate from the operating system of the host;
wherein each of the containers is generated by a separate toolchain to include custom runtime libraries, wherein the firewall utilizes the custom libraries rather than the host libraries, and wherein user privileges within each container are different from user privileges for the host; and executing the firewall to inspect data packets processed by the embedded networking.

9. A non-transitory computer-readable media in an embedded network device communicatively coupled to a data communication network with a plurality of stations, for providing a firewall with containerization in an embedded networking device, the method comprising the steps of:

spawning a new container of a plurality of containers in an operating system of a host to execute a firewall separate from the operating system of the host;

wherein each of the containers is generated by a separate toolchain to include custom runtime libraries, wherein the firewall utilizes the custom libraries rather than the host libraries, and wherein user privileges within each container are different from user privileges for the host; and executing the firewall to inspect data packets processed by the embedded networking.

* * * * *